United States Patent [19]

Jones

[11] Patent Number: 4,915,870

[45] Date of Patent: Apr. 10, 1990

[54] PROCESS FOR THE MANUFACTURE OF POTASSIUM STABILIZED SILICA SOLS

[75] Inventor: Robert D. Jones, Naperville, Ill.

[73] Assignee: Nalco Chemical Company, Naperville, Ill.

[21] Appl. No.: 254,769

[22] Filed: Oct. 7, 1988

[51] Int. Cl.$^4$ .............................................. C09K 13/02
[52] U.S. Cl. .................... 252/313.2; 252/310; 252/306; 252/302
[58] Field of Search .............. 252/313.2, 310, 306, 252/302; 106/287.34

[56] References Cited

U.S. PATENT DOCUMENTS

| | | |
|---|---|---|
| 2,577,484 | 12/1951 | Rule . |
| 3,239,521 | 3/1966 | Weldes . |
| 3,326,910 | 6/1967 | Weldes . |
| 3,582,494 | 6/1971 | Vossos et al. . |
| 3,597,248 | 8/1971 | Yates . |
| 3,630,954 | 12/1971 | Yates . |
| 4,054,536 | 10/1977 | Schaefer et al. . |

*Primary Examiner*—Mary C. Lee
*Assistant Examiner*—Catherine S. Kilby Scalzo
*Attorney, Agent, or Firm*—Anthony L. Cupoli; Donald G. Epple

[57] ABSTRACT

A method for producing a silica sols containing less than 150 ppm sodium haivng an average particle size of 2-110 nm, and a particle size distribution with a coefficient dispersion of 0.16-0.4. The silica sols are produced using a KOH heal to which aliquots of modified silicic acid containing acidic anions are added. The aliquots are added to maintain a substantially constant concentration of colloidal silica in the product. Subsequent to production, the sols may be concentrated by ultrafiltration.

Preparation of low sodium silica sols utilizing a constant silica technique by heating the initial heel to a temperature greater than 80° C. and adding additional silica maintaining an approximately constant total silica. The stabilization is effected with a KOH.

5 Claims, No Drawings

PROCESS FOR THE MANUFACTURE OF POTASSIUM STABILIZED SILICA SOLS

THE INVENTION

The field of the invention is the preparation of low sodium silica sols. More particularly the invention is directed to low sodium silica sols having less than 100ppm sodium.

BACKGROUND

Recent advances in the application of colloidal silica have brought an increase in the demand for low sodium colloidal silica products. Producers of electronic chips currently view the presence of sodium as an undesirable contaminant. Their belief is that sodium ions present in the final product result in defective microchips. Thus, manufacturers of electronic components have begun to request that the materials used in manufacturing have lower sodium levels.

The areas of coatings and catalysts also have seen an increase in demand for low sodium colloidal silica products. Excessive sodium can lead to unwanted haze or cracking in many coating applications. Sodium has been shown to be detrimental to catalyst behavior by lessening the selectivity and activity of catalysts. In many instances, the presence of sodium leads to total catalyst deactivation.

The following patents teach the production of low sodium silica sols:

Weldes, U.S. Pat. No. 3,239,521 discloses a method of forming soluble sodium free hydroxylated organic quaternary nitrogen silicates. While producing a silica containing compounds substantially free sodium, Weldes does not form a sols and his ratio of quaternary to silica content is high. Another Weldes Patent U.S. Pat. No. 3,326,910 also discloses a method for preparation of amine silicates which are substantially free of alkali metal ions. Again, the silicate used is reacted with an amine and the resulting amine silicate solution is apparently soluble in water.

Yates, U.S. Pat. No. 3,597,248 discloses a method of producing guanidine silicates. Again, the form of the silicate is water soluble and contains a large percentage of the organic amine. A second Yates Patent, U.S. Pat. No. 3,630,954 discloses colloidal silica sols having a high surface are which are stabilized by an organic amine and strong base.

Vossos et al. U.S. Pat. No. 3,582,494 discloses a method for producing alkaline aqueous colloidal silica sols from salt free acidic colloidal sols by treating such acidic sols with at least 0.003% by weight, based on the weight of the silica in such sols, of a salt whose anion is derived from a weak acid and whose ionization constant should not exceed that of carbonic acid in order to stabilize the sols.

Rule, U.S. Pat. No. 2,577,484 discloses a process for producing stable silica sols having an SiO$_2$ to "base" molar ration, expressed as "M$_2$O" being from 130:1 to 500:1. Rule also discloses a method for utilizing alkanol amines as a stabilizer.

Schaefer, U.S. Pat. No. 4,054,536 discloses a process producing silica sols free of metal oxides thorough the use of organic amines. Such sols having broad particle size ranges and short stabilities.

SUMMARY OF THE INVENTION

The invention includes a potassium based method of preparing silica sols which contain less than 150 ppm sodium (w/w) on a product basis, and preferably less than 100.

A method of producing the low sodium silica sols comprising the following steps:

A. Providing a 0.1%-5% aqueous solution solution of a potassium,
B. Heating the aqueous solution of the potassium hydroxide to at least 80° C.,
C. Preparing a modified acid sol by mixing aqueous silicic acid and another acid in a weight ratio of silicic acid to the other acid with the range of from 10:1 to 150:1;
D. Adding to the heated aqueous solution of the KOH a 2 to 10% by weight modified acid sols in a volume ratio of from 2:1 to 15:1, the mole ratio of SiO$_2$: KOH being in the range of 1:1 to 150:1 thereby producing the silica sols; and then,
D. Concentrating the silica sols by either distillation or ultrafiltration so as to recover an aqueous colloidal silica sols which contains 5-55% by weight SiO$_2$ having pH of 8-10.5 and containing less than 150ppm sodium metal.

The process wherein the heel is composed of a KOH and anion modified silicic acid such that the ratio of anion modified SiO$_2$ to KOH ratio is 1:1 to 50:1.

The silica sols generally have an average particle size of 2-110 nm and preferably of from 10-30nm and a particle size distribution with coefficient of dispersion of 0.16-0.4 and preferably 0.16 to 0.25. These sols exhibit long-term stability.

The potassium based low sodium silica sols are prepared employing KOH and acidic anions (such as Cl$^-$, SO$_4^{-2}$, NO$_3^-$). The heel includes KOH and/or water and modified silicic acid (i.e. acid sol), where the acid sol has been modified by the addition of an acid or acid salt. Generally, the heel may contain from 0.1 to 5 wt.% aqueous KOH, and preferably from 0.5 to 2.2 wt. % KOH. The heel may include from 0.-10% modified acid sol.

The invention includes the steps of heating a heel containing from 0.1 to 5 wt. % of a KOH to a temperature within the range of from 80° C. to 130° C. and preferably within the range of 80° C. to 110° C. and most preferably within the range of 90° C. to 105° C. temperature and then adding aliquots of modified acid sols to the heel. The aliquots are added at a measured rate designed to maintain substantially constant concentration of SiO$_2$ (2-6 wt.%) in the mixture.

The method of preparation of the new potassium based low sodium sols of this invention differs from the previous work in two important ways. The first difference is that the particle growth process and the concentration process are separate steps. Previous work combined the particle growth and concentration steps into a simultaneous procedure. The second difference occurs in that the silica sol is directly prepared from a potassium source rather than removing the sodium then replacing it with potassium or using drastic synthetic preparatory conditions.

EXAMPLES

Materials

Reagent grade KOH potassium hydroxide was used for all preparations.

Acid sols (decationized sodium silicate) was prepared for synthesis by cation exchanging diluted sodium silicate by passing it through Dow HGR-W2 resin in the Hydrogen form. The starting sodium silicate concentration was adjusted such that the acid sols produced had a silica concentration of 5.0±0.1 (w/w). The acid sols for the process area synthesis varied in concentration from 4.5 to 6.2 percent $SiO_2$.

Laboratory Preparations

Modified acid sols was prepared by adding to the freshly prepared aqueous silica acid, an acid or acid salt. Although $HNO_3$, HCl, $H_3PO_4$, $H_2SO_3$, acetic acid and the potassium salts of these acids are examplory other acids or acid salts are usable.

EXAMPLE 1

In the laboratory, a mixture of 10.58 gm 45% KOH (w/w) and 338 gm $H_2O$ was heated to 95° C. Modified acid sol containing 157.9 g of $SiO_2$ and 2.68 g of concentrated $HNO_3$ was added over a 2¼ hour period with heating and stirring. The reaction produced a 5% silica sols with an average particle size of 18 nm.

EXAMPLE 2

In the laboratory, a mixture of 10.58 g KOH (45% w/w) and 305 ml $H_2O$ was heated to 85° C. Oven a 135 minute period a mixture of 2788.4g silicic acid (5.66% $SiO_2$ w/w) and 1.34 g nitric acid was added with heating and stirring. After completion of the modified acid sols mixture the reaction was heated and stirred for 30 minutes. This produced a 2 nm product at a $SiO_2$ concentration of 5% (w/w).

EXAMPLE 3

In the laboratory a mixture of 289.7g $H_2O$ and 10.58 g of 45% KOH (w/w) was heated to 95° C. Modified acid sols containing acid sols (2710.3 g 5.83% $SiO_2$) and acetic acid (1.50g) was added over a 135 minute period with heating and stirring. After completion of the modified acid sols addition the mixture was stirred and heated for an additional 30 minutes. This produced a 16 nm product at a $SiO_2$ concentration of 5% (w/w).

EXAMPLE 4

In the laboratory, a mixture of 10.58gm 45% KOH (w/w) and 289.7g $H_2$ was heated to 95° C. Modified acid sols containing acid sols (2810.3g, 5.83% $SiO_2$) and acetic acid (2.86g) was added over a 135 minute period with heating and stirring. After completion of the modified acid sols addition the reaction was heated and stirred for 30 minutes. This produced a 17 nm product at a $SiO_2$ concentration of 5% (w/w).

EXAMPLE 5

IN a 50 gallon reactor five gallons of $H_2O$ and 559.0 g of 45% KOH (w/w) were added and mixed. After heating the mixture to 97° C. a mixture of silicic acid (19.54 Kg, 5.34% $SiO_2$) and nitric acid (141.6g) was added to the reactor over a 131 minute period maintaining the temperature at 97° C. After completing the addition of the acid sols mixture the reaction was stirred and heated for 30 minutes.

After cooling the mixture to 30° C. the product was concentrated to 30% $SiO_2$ (w/w) using normally concentrating methods. The average particle size was 20 nm.

EXAMPLE 6

In a 50 gallon reactor five gallons of $H_2O$ and 515g of 45% KOH (w/w) were added and mixed. After heating to 98° C., a mixture of silicic acid (19.54 Kg, 4.92% $SiO_2$) and nitric acid (130.5g) was added to the reactor over a 139 minute period maintaining the temperature in the range of 95°-96° C. After completing the addition of the acid sols mixture, the reaction was stirred and heated for 30 minutes.

After cooling the mixture to 30° C. the product was concentrated to 30% $SiO_2$(w/w) using normal concentrating methods. The average particle size was 18 nm.

Now that we have described our invention, we claim as follows:

1. A method for producing a low sodium silica sol comprising the following steps:
   A. providing a 0.1%–5% aqueous solution of potassium hydroxide,
   B. heating the aqueous solution of the potassium hydroxide to at least 80° C.,
   C. preparing a modified acid sol by mixing aqueous silicic acid and another acid in a weight ratio of silicic acid to the other acid within the range of from 10:1 to 150:1;
   D. Adding to the heated aqueous solution of the KOH a 2 to 10% by weight modified acid sol in a volume ratio of from 2:1 to 15:1, the mole ratio of $SiO_2$: KOH being in the range of 1:1 to 150:1, at a rate which maintains a substantially constant, concentration of $SiO_2$ in the resultant mixture thereby producing the silica sol and then,
   E. concentrating the silica sol by either distillation or ultrafiltration so as to recover an aqueous colloidal silica sols which contains 5–55% by weight $SiO_2$ having a pH of 8–10.5 and containing less than 150ppm sodium metal.

2. The method of claim 1, where in Step B the aqueous solution is selected to a temperature within the range of 80°–130° C.

3. The method of claim 2 wherein the other acid specific in step C is a water-soluble acid having an anion selected from the group consisting of chloride, nitrate, sulfate, sulfite, phosphate, and acetate.

4. The method of claim 3, wherein in Step B the aqueous solution is heated to a temperature within the range of 90°–130° C.

5. The method of claim 3 wherein a constant concentration of 2 to 6 weight % $SiO_2$ is maintained in the mixture formed when modified acid sol is added to the aqueous heated solution of potassium hydroxide.

* * * * *